(12) United States Patent
Ono et al.

(10) Patent No.: US 12,196,670 B2
(45) Date of Patent: Jan. 14, 2025

(54) FAR-INFRARED SPECTROSCOPY DEVICE

(71) Applicant: Hitachi High-Tech Corporation, Tokyo (JP)

(72) Inventors: Touya Ono, Tokyo (JP); Mizuki Mohara, Tokyo (JP); Kei Shimura, Tokyo (JP); Kenji Aiko, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 258 days.

(21) Appl. No.: 18/007,942

(22) PCT Filed: Jun. 22, 2020

(86) PCT No.: PCT/JP2020/024315
§ 371 (c)(1),
(2) Date: Dec. 2, 2022

(87) PCT Pub. No.: WO2021/260752
PCT Pub. Date: Dec. 30, 2021

(65) Prior Publication Data
US 2023/0236123 A1    Jul. 27, 2023

(51) Int. Cl.
*G01N 21/3581* (2014.01)

(52) U.S. Cl.
CPC ................. *G01N 21/3581* (2013.01)

(58) Field of Classification Search
None
See application file for complete search history.

(56) References Cited

U.S. PATENT DOCUMENTS

| | | | |
|---|---|---|---|
| 6,957,099 B1* | 10/2005 | Arnone | G01N 21/3586 600/473 |
| 2002/0185474 A1* | 12/2002 | Dunsky | B23K 26/389 219/121.61 |

(Continued)

FOREIGN PATENT DOCUMENTS

| | | |
|---|---|---|
| JP | 2009-204605 A | 9/2009 |
| JP | 2010-523970 A | 7/2010 |
| JP | 2011-7590 A | 1/2011 |

OTHER PUBLICATIONS

International Search Report (PCT/ISA/210) issued in PCT Application No. PCT/JP2020/024315 dated Sep. 15, 2020 with English translation (five (5) pages.

(Continued)

*Primary Examiner* — Hoon K Song
(74) *Attorney, Agent, or Firm* — Crowell & Moring LLP (57) ABSTRACT

This far-infrared spectroscopy device comprises a holding mechanism that is capable of holding a sample in humid air, a detector for detecting light obtained by emitting far infrared light onto the sample, and a signal processing unit for calculating an absorption spectrum of the sample from a signal from the detector. The signal processing unit comprises a threshold processing unit that subjects the signal from the detector to threshold processing and removes the part of the signal influenced by the absorption by the water vapor in the humid air, a signal interpolation unit that carries out interpolation on the signal that has been subjected to the removal by the threshold processing unit, and an absorbance calculation unit for calculating an absorbance from the signal that has been subjected to the interpolation by the signal interpolation unit.

10 Claims, 10 Drawing Sheets

(56) References Cited

U.S. PATENT DOCUMENTS

| | | | |
|---|---|---|---|
| 2005/0087690 A1* | 4/2005 | Usami | G01N 21/03 |
| | | | 250/341.1 |
| 2009/0189078 A1 | 7/2009 | Itsuji | |
| 2010/0099139 A1 | 4/2010 | Ben-David et al. | |

OTHER PUBLICATIONS

Japanese-language Written Opinion (PCT/ISA/237) issued in PCT Application No. PCT/JP2020/024315 dated Sep. 15, 2020 (five (5) pages).

\* cited by examiner

|     | k_(i-5) | k_(i-4) | k_(i-3) | k_(i-2) | k_(i-1) | k_(i) |
| --- | --- | --- | --- | --- | --- | --- |
| (a) | 0.02 | 0.02 | 0.03 | 0.03 | 0.18 | 0.35 |
| (b) | - | - | - | - | -1 | 1 |
| (c) | - | - | - | - | - | 1 |

|     | k_(i+1) | k_(i+2) | k_(i+3) | k_(i+4) | k_(i+5) |
| --- | --- | --- | --- | --- | --- |
| (a) | 0.18 | 0.03 | 0.03 | 0.02 | 0.02 |
| (b) | - | - | - | - | - |
| (c) | -1 | - | - | - | - |

FAR-INFRARED SPECTROSCOPY DEVICE

TECHNICAL FIELD

The present invention relates to a far-infrared spectroscopy device.

BACKGROUND ART

Far infrared light of 0.1 THz to 10 THz is also called a terahertz wave. This frequency band corresponds to a middle of a radio wave and light, and the terahertz wave is characterized by having both straightly going property of light and high transmissivity. In addition, since the terahertz light has energy corresponding to an excitation bandwidth of a phonon mode, an absorption spectrum derived from a lattice vibration or an intermolecular vibration can be obtained.

Since the absorption spectrum can be observed at a frequency unique to a substance, the absorption spectrum is used for non-destructive identification of the substance. By applying the above characteristics, industrial applications such as an imaging technique including dangerous substance inspection and medicine inspection, and a component quantitative analysis are also expected.

As one terahertz spectroscopy method, a terahertz time domain spectroscopy (THz-Time Domain System: THz-TDS) method is known which was put into practical use from the 1990's and generally used thereafter. In the THz-TDS method, a time waveform of a broadband terahertz pulse is acquired by using a femtocell laser as a light source. By performing a fast Fourier transform on the time waveform, frequency dependence of a power spectrum, that is, the absorption spectrum can be obtained.

In a medicine inspection field, research and development for destructive or non-destructive inspection of a medicine using infrared light, ultraviolet light, Raman scattered light, terahertz light, and the like is progressing. In particular, research and development for supporting an in-line method, in which a spectroscopy device is introduced during a manufacturing process for inspection is progressing, and it is expected that portability and versatility of the spectroscopy device will be emphasized more in the future.

However, since the terahertz light exhibits strong absorption in water, there is a problem that attenuation when the terahertz light propagates through the ambient air is large. Therefore, in a normal terahertz spectroscopy measurement, it is required to fill a light path with a gas such as dry air in which the attenuation of the terahertz light is small. This makes it difficult to put the spectroscopy measurement into practical use in the medicine inspection in the in-line method. In addition, such a change in humidity may cause a change in crystalline forms and properties of the medicine itself.

Since the terahertz wave is strongly absorbed by water vapor in ambient air, multiple absorptions derived from the water vapor are confirmed in an absorption spectrum acquired in an environment with relative humidity (Rh) of 10% or more. Accordingly, when a sample is measured under humid air, there is a problem that it is difficult to determine an absorption spectrum derived from the sample. Further, when the sample is measured in a low-humidity or high-humidity environment, there is a problem that properties of the sample will change and stability of the sample will be impaired due to acceleration of water dehydration or absorption in the sample.

As an example of a reason why such fine adjustment of a detection signal is required, the following is conceivable. In the absorption spectrum of the water vapor, for example, a plurality of absorption peaks may be present close to each other at an interval within 10 GHz in a range of 1 THz to 3 THz. That is, unless a frequency resolution is very high such as about several GHz, a shift of an absorption peak frequency (peak shift) of the water vapor and distortion of the absorption peak are observed every time the measurement is performed. Alternatively, it is conceivable that scattering may occur due to expansion or the like of a sample containing the water vapor, and the detection signal decreases. Even if the frequency resolution is sufficient, a huge amount of sampling of the time waveform (in a case of the TDS method) and fine wavelength sweeping (in a case of is-TPG method) are required, so that the versatility is greatly lacking from a viewpoint of an inspection speed.

Citation List

Patent Literature

PTL 1: JP-A-2009-204605

SUMMARY OF INVENTION

Technical Problem

An object of the invention is to provide a far-infrared spectroscopy device capable of accurately measuring, even in any humid air atmosphere, an absorption spectrum derived from a sample by reducing an influence of an absorption of water vapor.

Solution to Problem

In order to solve the above problems, a far-infrared analysis device according to the invention includes a holding mechanism configured to hold a sample in humid air, a detector configured to detect light obtained by emitting far infrared light onto the sample, and a signal processing unit configured to calculate an absorption spectrum of the sample based on a signal from the detector. The signal processing unit includes a threshold processing unit configured to perform threshold processing on the signal from the detector and remove a part of the signal influenced by an absorption of water vapor in the humid air, a signal interpolation unit configured to interpolate the signal subjected to the removal performed by the threshold processing unit, and an absorbance calculation unit configured to calculate an absorbance based on the signal interpolated by the signal interpolation unit.

Advantageous Effects of Invention

According to the invention, a far-infrared spectroscopy device capable of accurately measuring, even in any humid air atmosphere, an absorption spectrum derived from a sample by reducing an influence of an absorption spectrum derived from water vapor can be provided.

DESCRIPTION OF EMBODIMENTS

Hereinafter, embodiments will be described with reference to the accompanying drawings. In the accompanying drawings, functionally the same element may be represented by the same number. The accompanying drawings show embodiments and implementation examples consistent with principles of the disclosure, are for the understanding of the disclosure, and are not intended to be construed in a limiting sense. Descriptions in this specification are merely exemplary, and are not intended to limit the scope of the claims or application of the disclosure in any sense.

It is necessary to understand that the embodiments are described in sufficient detail for those skilled in the art to perform the disclosure, but other implementations and aspects are possible, and a configuration and a structure can be changed and various elements can be replaced without departing from the scope and the spirit of the technical idea of the disclosure. Therefore, the following description should not be construed as being limited to the embodiments.

First Embodiment

Figure 1A:
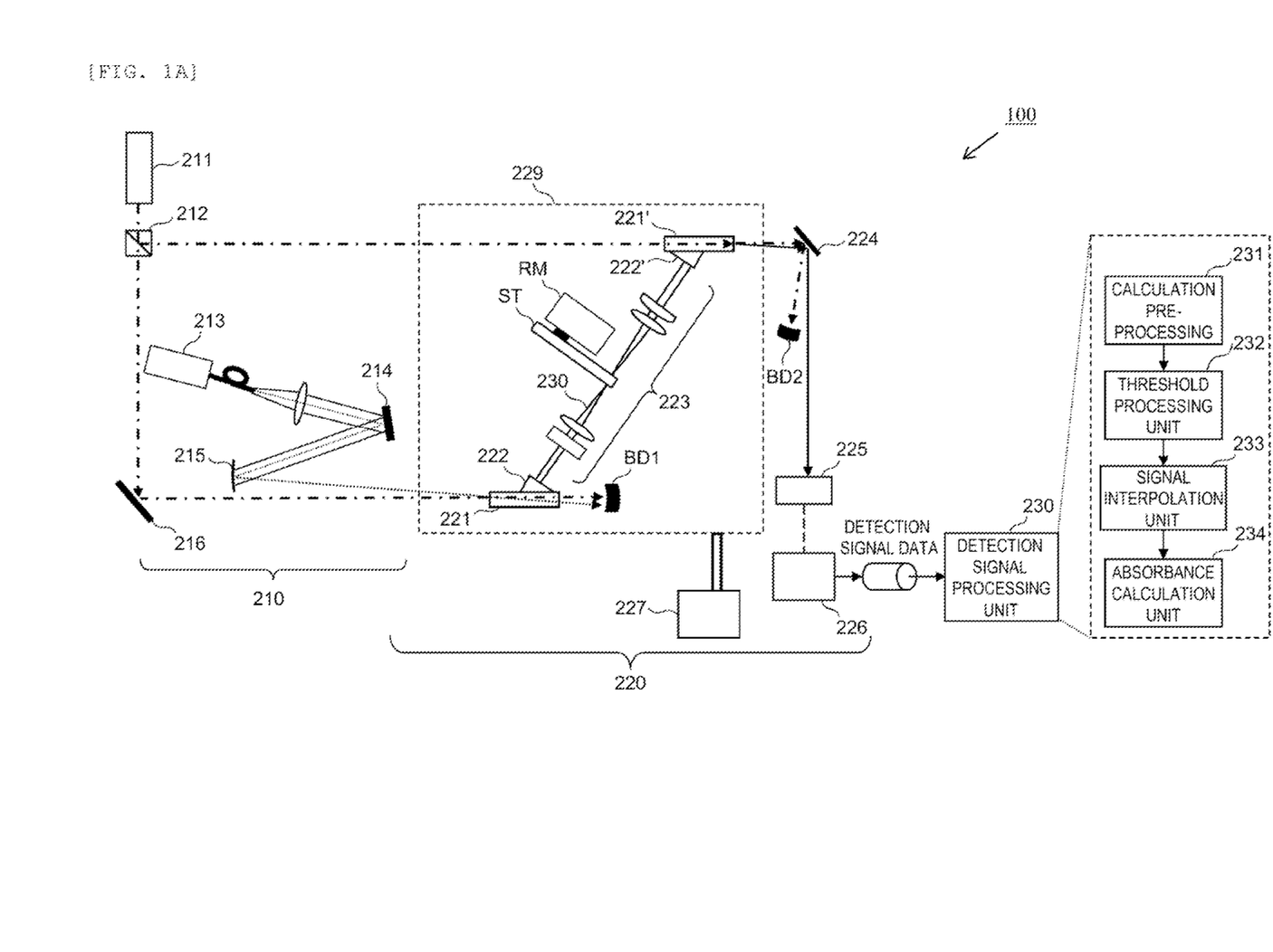
FIG. 1A is a schematic diagram illustrating a configuration of a far-infrared spectroscopy device 100 according to a first embodiment.

A configuration of a far-infrared spectroscopy device 100 according to a first embodiment will be described with reference to FIG. 1A. The far-infrared spectroscopy device 100 includes a light source unit 210, an optical system 220, and a detection signal processing unit 230.

In the light source unit 210 and the optical system 220, a terahertz optical parametric method using an injection-seeded terahertz parametric generation (is-TPG) light source is applied, and high intensity light (here, terahertz light) is generated based on two types of light having different wavelengths by using a nonlinear optical crystal. The is-TPG method is superior to a TDS method in terms of peak power and frequency resolution. In the following description, a device using the is-TPG light source is mainly described as an example, but the invention is also applicable to the TDS method.

Details of the light source unit 210 will be described with reference to FIG. 1A. The light source unit 210 includes a light source 211 as a pump light source, a polarization beam splitter 212, a light source 213 as a seed light source, and optical elements 214 and 215. The light source unit 210 (is-TPG light source unit) includes the two light sources 211 and 213 that emit near-infrared light. The two light sources 211 and 213 emit near-infrared light having different wavelengths.

The light source 211 is a pump light source, and, for example, a microchip laser can be used. Emitted light (pump light) from the light source 211 branches into two directions by the polarization beam splitter 212, the light in one direction is directed to a nonlinear optical crystal 221 via a mirror 216, and the light in the other is directed to a nonlinear optical crystal 221'.

The light source 213 is a seed light source, and, for example, a wavelength tunable semiconductor laser can be used. The optical element 214 is a reflecting mirror capable of performing angle control, and, for example, a galvanometer mirror can be used. As the optical element 215, for example, a concave mirror can be used. Emitted light (seed light) from the light source 213 is incident on the nonlinear optical crystal 221 via the optical elements 214 and 215. The seed light is emitted, under the angle control of the optical element 214, at an angle (horizontal direction in the drawing) that satisfies a phase matching angle with respect to the pump light. At this time, since an incident surface of the nonlinear optical crystal 221 is in an imaging relationship with a surface of the optical element 214, an irradiation position of the seed light on the incident surface of the nonlinear optical crystal 221 does not change even when an angle of the optical element 214 is changed.

Next, details of the optical system 220 will be described with reference to FIG. 1A. The optical system 220 includes a sealed chamber 229, a near-infrared light detector 225, a control unit 226, and a dry air supply unit 227.

A terahertz light generating mechanism in which the nonlinear optical crystal 221 and a Si prism 222 are crimped is mounted inside a sample chamber implemented by the sealed chamber 229. Terahertz light having any wavelength is generated by the pump light incident on the nonlinear optical crystal 221 and seed light having a tunable wavelength. A beam damper BD1 for absorbing unnecessary light passing through the nonlinear optical crystal 221 is provided in a vicinity of the nonlinear optical crystal 221.

A mechanism in which the nonlinear optical crystal 221' and a Si prism 222' are crimped is also disposed inside the sample chamber. The nonlinear optical crystal 221' and the Si prism 222' may be the same mechanism (structure) as the nonlinear optical crystal 221 and the Si prism 222, and function as a generation unit of detection light (near-infrared light). Light from the Si prism 222 is guided to the nonlinear optical crystal 221' by a light guiding optical system 223.

A sample table ST and a moving stage RM holding the sample table ST are provided near a middle of the nonlinear crystals 221 and 221' inside the sample chamber. The sample table ST, the moving stage RM, and the sample chamber constitute a holding mechanism that holds a sample in humid air. The sample table ST and the moving stage RM are disposed such that a sample loaded on the sample table ST is inserted into and removed from a light path of the terahertz light described above.

The terahertz light emitted from the nonlinear crystal 221 is emitted to the sample loaded on the sample table ST. The sample table ST is supported by the moving stage RM, and is configured to move the sample in a translational direction (perpendicular to or parallel to the drawing), so as to appropriately move a position to which the light is emitted. In addition, the moving stage RM appropriately moves the sample out of an irradiation range of the terahertz light, and thereby sets, as reference data, a signal intensity of the near-infrared light detected without placing the sample on the sample table. In the illustrated example, the near-infrared light generated from the nonlinear crystal 221' by the pump light and terahertz light passing through the sample is used as the detection light, but terahertz light reflected by the sample may also be used.

The terahertz light transmitted through the sample is incident on the nonlinear crystal 221' together with the pump light coming from the polarization beam splitter 212, and generates near-infrared light as described later. The near-infrared light is used as the detection light and guided to the near-infrared light detector 225. A detection signal indicating an absorption of the terahertz light unique to the sample is acquired by the near-infrared light detector 225. The detection signal is converted into detection signal data by the control unit 226 and transmitted to the detection signal processing unit 230. In order to obtain reference data for spectral calculation, near-infrared light acquired in a state where nothing passes through the sample is acquired by the near-infrared light detector 225 in parallel with measurement of the sample. At what frequency and to what degree a signal of the near-infrared light detected with the sample interposed is attenuated can be examined by comparison with the reference data.

The reference data and the detection signal data obtained with the sample interposed are each converted into spectrum data by the detection signal processing unit 230. Specifically, the detection signal processing unit 230 includes a calculation pre-processing unit 231, a threshold processing unit 232, a signal interpolation unit 233, and an absorbance calculation unit 234.

The calculation pre-processing unit 231 is a part that converts the detection signal data into a data format that can be subjected to threshold processing. The threshold processing unit 232 is a part that generates threshold data according to the detection signal data and executes processing for excluding a part of the data. The signal interpolation unit 233 is a part that executes data interpolation processing on the data subjected to the excluding performed by the threshold processing unit 232. The absorbance calculation unit 234 is a part that calculates an absorbance of the sample by using the data after the data interpolation. A beam damper BD2 for absorbing unnecessary light passing through the nonlinear optical crystal 221' is provided in a vicinity of the mirror 224.

The dry air supply unit 227 is connected to the sealed chamber 229 and supplies dry air to an inside of the sealed chamber 229. Accordingly, the inside of the sealed chamber can be kept in a dry state.

Figures 1B, 1C:
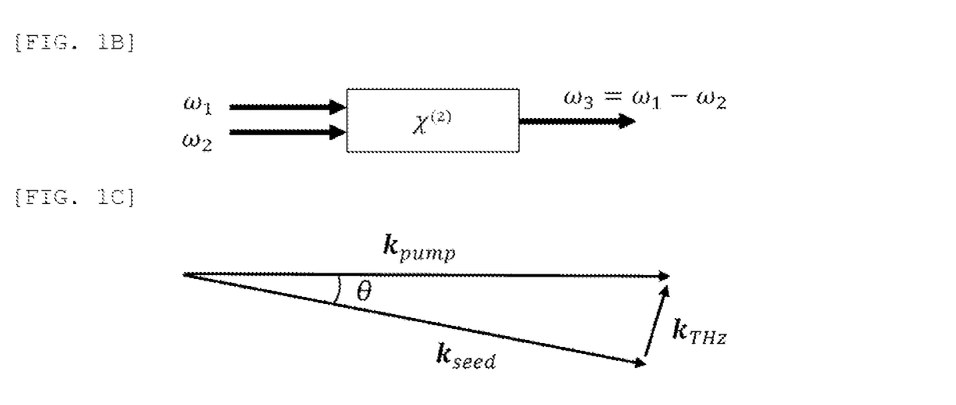
FIG. 1B is a diagram showing that light with different angular frequencies $\omega_1$ and $\omega_2$ is incident on a nonlinear optical crystal having a second-order nonlinear susceptibility $\chi^{(2)}$ and difference frequency generation of light with an angular frequency $\omega_3$ occurs.
FIG. 1C is a vector diagram showing difference frequency generation of terahertz light derived from a light source unit 210 (is-TPG light source unit).

Next, generation of the terahertz light based on a difference frequency generation method will be described with reference to FIGS. 1B and 1C. FIG. 1B is a diagram showing that light with different angular frequencies $\omega_1$ and $\omega_2$ is incident on a nonlinear optical crystal having a second-order nonlinear susceptibility $x^{(2)}$ and difference frequency generation of light with an angular frequency $\omega_3$ occurs. FIG. 1C is a vector diagram showing difference frequency generation of terahertz light derived from the light source unit 210 (is-TPG light source unit).

When a frequency of the pump light is $\omega_{pump}$, a frequency of the seed light is $\omega_{seed}$, and a frequency of the terahertz light is $\omega_{THz}$, the terahertz light is obtained by difference frequency generation shown in Equation (1).

$$\omega_{pump} - \omega_{seed} = \omega_{THz} \quad (1)$$

When both sides of Equation (1) indicating the difference frequency generation are multiplied by a Planck's constant h, a relational expression for describing optical energy is obtained, and this expression is based on an energy conservation law. Therefore, in the vector diagram of FIG. 1C in which a wave number vector of incident light from the light source 211 is $\rightarrow k_{pump}$, a wave number vector of incident light from a $k_{THz}$ seed light source is $\rightarrow k_{seed}$, an angle formed by the incident light is θ, and a wave number of the terahertz light is $\rightarrow k_{THz}$, when the angle θ is an angle (phase matching angle) that satisfies Equation (2), an intensity of the generated terahertz light is the maximum.

$$\rightarrow k_{pump} - \rightarrow k_{seed} = \rightarrow k_{THZ} \quad (2)$$

As in the above Equations (1) and (2), a state in which energy (or angular frequency) of one type of light changes in response to a change in energy (or angular frequency) of the other type of light is referred to as a parametric process, and a method of generating any light in this process is referred to as parametric generation.

An operation of the far-infrared spectroscopy device according to the first embodiment will be described with reference to a flowchart of FIG. 2. Regarding spectroscopy data acquired from the far-infrared spectroscopy device 100 that performs processing of FIG. 2, first, near-infrared light based on terahertz light that passes through the sample and near-infrared light based on terahertz light that does not pass through the sample are detected by the near-infrared light detector 225. During this time, the moving stage RM translationally moves, and the sample is inserted into and removed from the light path of the terahertz light.

Figure 3:
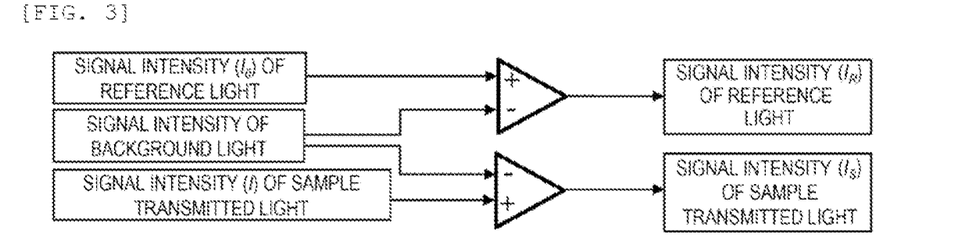
FIG. 3 is a schematic diagram illustrating signal preprocessing such as removal (subtraction) of background light (dark level) of a detector on reference data and all detection signal data of a sample.

In the next step S110, in order to eliminate an influence of background light received by the near-infrared light detector 225, the background light of the near-infrared light detector 225 is acquired in a state where the terahertz light incident on the sample is shielded. The detection signal processing unit 230 (calculation pre-processing unit 231) performs signal pre-processing such as removal (subtraction) of the background light (dark level) of the detector on the reference data and all signal data of the sample (see FIG. 3).

Next, in step S120, it is determined whether a measurement environment provided by the sealed chamber 229 is dry air. When the environment is dry air (Yes), the process proceeds to step S160 without executing the following procedure.

On the other hand, when the measurement environment in the sealed chamber 229 is not dry air but humid air (No), the threshold processing unit 232 performs the threshold processing to remove an absorption peak of the water vapor (steps S130 to S155). This will be described in detail below.

In step S130, it is determined whether to remove only a part of or an entire of the absorption peak of the water vapor. When it is determined to remove only a part of the absorption peak, only a bottom portion of the absorption peak is removed in step S140 (step S140). On the other hand, when it is determined to remove the entire absorption peak, after step S140 is executed, a skirt portion of the absorption peak is also further removed (step S150).

Accordingly, an influence of an absorption of the water vapor on the absorption spectrum of the sample is reduced. After removing the bottom portion, or removing the bottom portion and the skirt portion, linear interpolation is executed for the removed part to restore the data (step S155).

A transmittance of the sample is calculated by using the data after the absorption peak of the water vapor is partially or entirely removed in this way, and the calculated transmittance is displayed on a display or the like (step S160). In addition, data smoothing processing is executed (step S170), and the absorbance of the sample is displayed based on the smoothing result (step S180).

Next, a method of generating two patterns of thresholds executed in steps S125 to S150 will be described in detail below.

Primary coupling (one-dimensional convolution) is performed on a signal waveform Io of the reference data with any coefficient to generate a threshold signal waveform Io'. Threshold signal waveform data $\chi i'$ having the same frequency as the signal waveform (Io) of the reference data is generated by calculating, based on reference data $\chi i$ acquired at a certain frequency among the signal waveform (Io) of the reference data and data n points before and after $\chi i$, a matrix product with primary coupling coefficients $[k_{i-n} \ldots k_i \ldots k_{i+n}]$ as shown in [Equation 1] and [Equation 2].

$$\begin{pmatrix} x_{i-n} \\ \vdots \\ x_i \\ \vdots \\ x_{i+n} \end{pmatrix} \begin{array}{c} \text{PRIMARY COUPLING COEFFICIENT} \\ (k_{i-n} \ \ldots \ k_i \ \ldots \ k_{i+n}) \end{array}$$ [Math. 1]

$$x'_i = k_{i-n}x_{i-n} + k_{i-n+1}x_{i-n+1} + \ldots + k_i x_i + \ldots + k_{i+n-1}x_{i+n-1} + k_{i+n}x_{i+n}$$ [Math. 2]

When the [Equation 2] cannot be applied due to insufficiency of the acquired data immediately after start of the measurement or the like, $\chi i = \chi i'$. Alternatively, a data width n can be adjusted to generate the threshold signal waveform data $\chi i'$ from as much as possible reference data $\chi i$. Data obtained by connecting the generated threshold signal data $\chi i'$ in a frequency direction is used as the threshold signal waveform Io'. In step S125, Io and Io' are compared, and the threshold processing is performed to detect an attenuation part of the signal due to the absorption of the water vapor. By combining the primary coupling coefficients, feature data can be extracted from the signal waveform Io of the reference data, and various threshold signal waveforms Io' can be generated. These coefficients having different roles are collectively referred to as filter coefficients.

Figure 4:
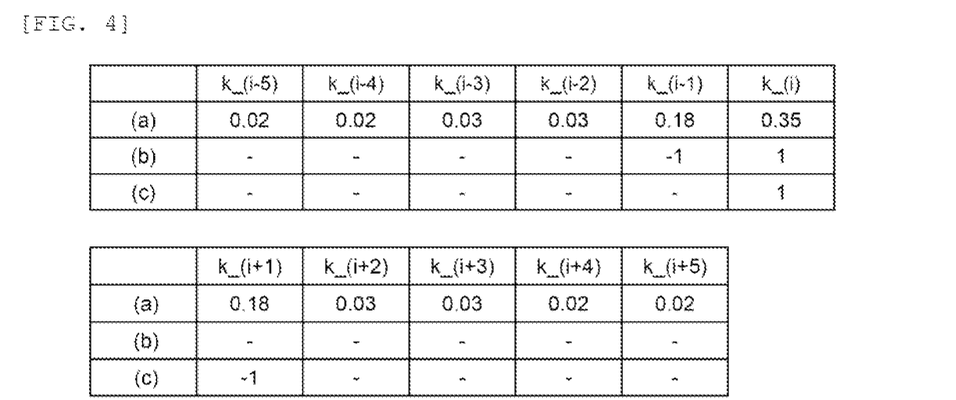
FIG. 4 is a table showing examples of three patterns of coefficients (a), (b), and (c) for generating threshold signal data Io'.
Figure 5A:
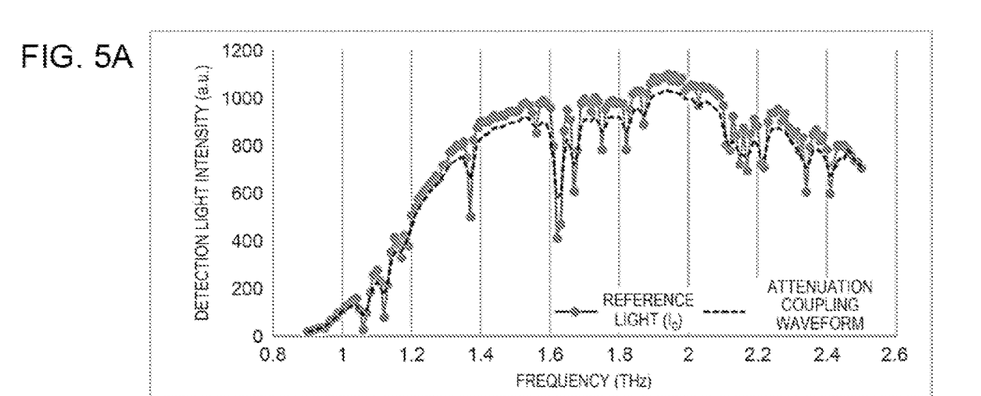
FIGS. 5A to 5C show examples of threshold signal data Io generated based on the coefficients (a), (b), and (c).
Figure 5B:
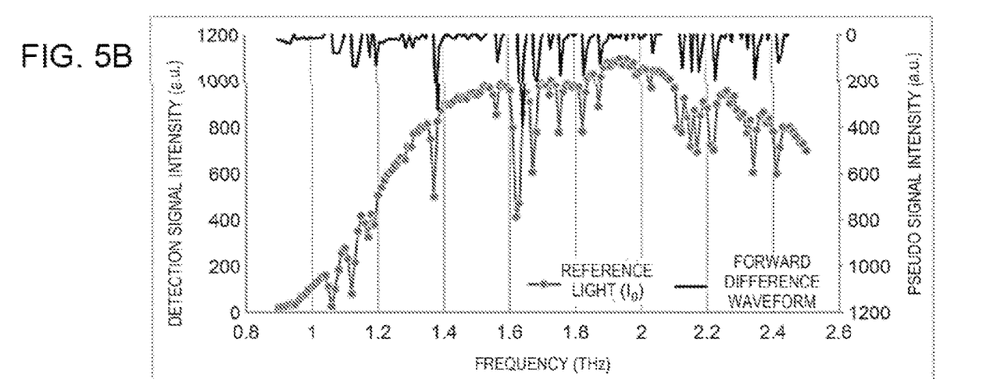
Figure 5C:
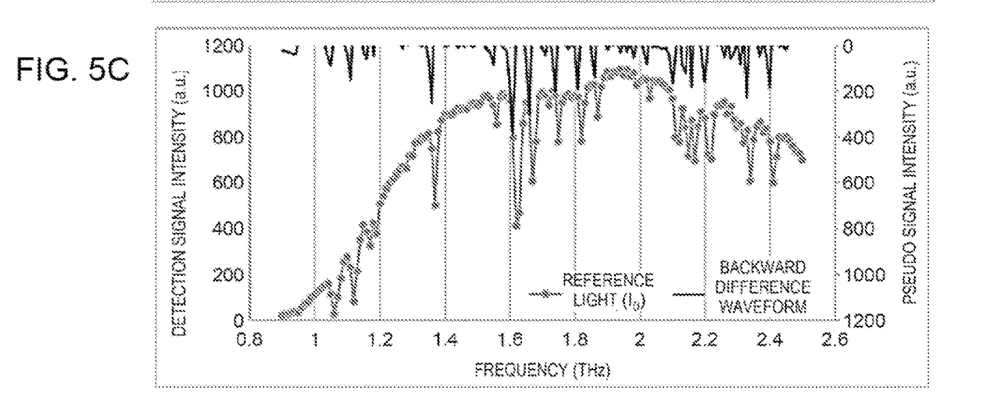

How the filter coefficients and the threshold signal waveforms Io' are used to detect the absorption peak of the water vapor will be described below with reference to the following examples. FIG. 4 shows three patterns of coefficients (a), (b), and (c), and (a), (b), and (c) of FIG. 5 show threshold signal waveforms Io' generated from these coefficients, respectively. The reference data (Io) in FIG. 5 is a signal intensity obtained by filling the inside of the sealed chamber 229 with humid air (60% Rh or more) and with light not passing through the sample. A part where the signal is attenuated largely at a specific frequency is a frequency at which the absorption of the water vapor is observed.

Figure 2:
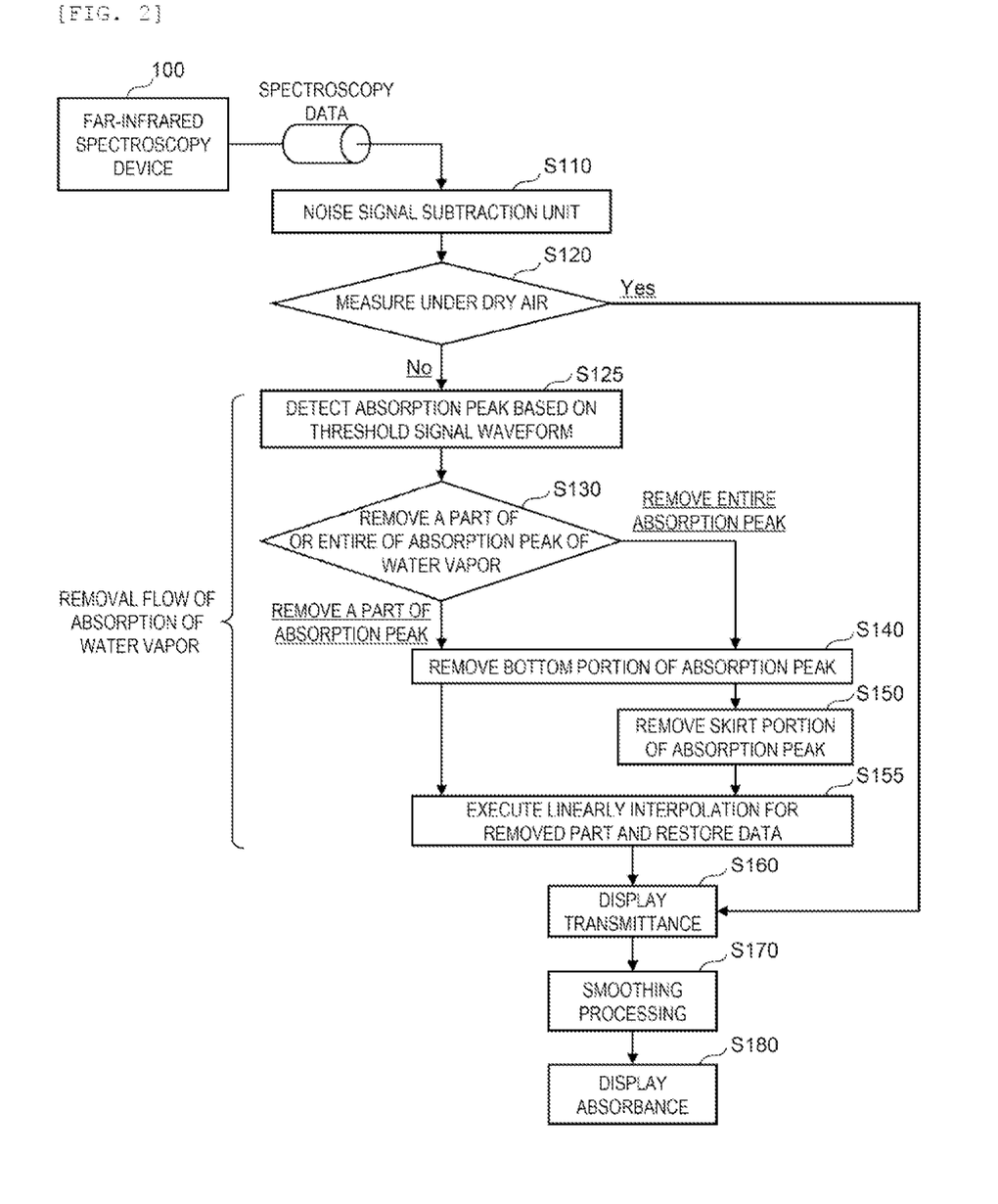
FIG. 2 is a flowchart illustrating an operation of the far-infrared spectroscopy device 100 according to the first embodiment.

In step S140 of the flowchart of FIG. 2, in order to remove the bottom portion of the absorption peak, for example, the threshold signal waveform Io' generated by applying the coefficients (a) can be used. The coefficients (a) are a triangular window function characterized in that a sum of the filter coefficients is less than 1, and the number of reference data to be subjected to the primary coupling is larger than the number of data points forming the absorption peak of the water vapor to be observed.

Regarding the filter coefficients and the number of reference data, a threshold signal waveform Io' having a lower signal intensity and a lower frequency resolution as compared with the signal waveform Io of the reference data is obtained by an effect of the triangular window function having the above characteristics. The threshold signal waveform Io' generated by the coefficients (a) is shown in (a) of FIG. 5.

The threshold signal waveform Io' represented by the characteristics of the coefficients (a) is referred to as an attenuation coupling waveform.

Figure 6A:
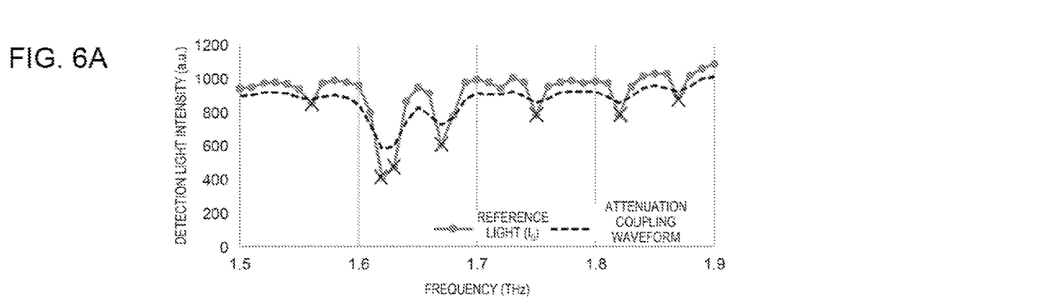
FIG. 6A shows examples of a waveform of the threshold signal data Io' generated under various conditions.

An example in which the attenuation coupling waveform is applied to the detection of the absorption peak of the water vapor is shown in (a) of FIG. 6A. In (a) of FIG. 6A, the attenuation coupling waveform Io' itself is set as a detection threshold, and frequency data of the detection signal waveform Io of the reference data in which Io'>Io is all removed as the absorption of the water vapor. An x mark in (a) of FIG. 6A indicates the frequency data detected as the absorption of the water vapor.

A maximum value and a sum of the coefficients (a) are determined so as not to detect a fluctuation of the signal intensity corresponding to a detection error. This is to prevent excessive detection of variation in very small signal amount included in the signal waveform Io of the reference data, which is not influenced by the water vapor. In this method, only the bottom portion of the peak waveform can be efficiently detected without excessively detecting the absorption peak of the water vapor. Further, since the threshold is always determined based on the signal waveform Io of the reference data, it is not necessary to set a threshold for determining the absorption of the water vapor, and it is not necessary to consider non-reproducibility of the waveform and intensity of the detection signal caused by changes in a device resolution and the measurement environment.

It is difficult to detect data forming a skirt of the absorption peak of the water vapor (inclined portion of the waveform of the absorption peak), such as data near 1.61 THz or 1.68 THz in (a) of FIG. 6A, in the attenuation coupling waveform, and the attenuation coupling waveform is not suitable for detection including the skirt portion of the absorption peak. Therefore, a method of detecting the skirt portion of the absorption peak by using a forward difference waveform or a backward difference waveform will be described below.

As shown in the filter coefficients (b) and (c) of FIG. 4, the data width n is set to 2, and difference waveforms shown in [Equation 3] and [Equation 4] shown below are generated as the threshold signal waveform Io'. Hereinafter, the waveform generated by [Equation 3] is referred to as a forward difference waveform, and the waveform generated by [Equation 4] is referred to as a backward difference waveform.

$$(k_i x_i - k_{i-1} x_{i-1})$$ [Math. 3]

$$(k_i x_i - k_{i+1} x_{i+1})$$ [Math. 4]

(b) of FIG. 6A shows a threshold signal waveform Io' and a signal waveform Io of the reference data generated by [Equation 3], and (c) of FIG. 6A shows a threshold signal waveform Io' and a signal waveform Io of the reference data generated by [Equation 4]. Here, only a positive waveform of the threshold signal waveform Io' is handled. In addition, it is illustrated that the threshold is defined to 40 as a boundary between the fluctuation of the detection signal intensity and an attenuation amount of the signal caused by the absorption of the water vapor. Examples of the detection of the absorption peak of the water vapor at this time are shown in (b) and (c) of FIG. 6A. (b) of FIG. 6A shows a result obtained by detecting data of a skirt inclined in a negative direction, and (c) of FIG. 6A shows a result obtained by detecting data of a skirt inclined in a positive direction.

Figure 6B:
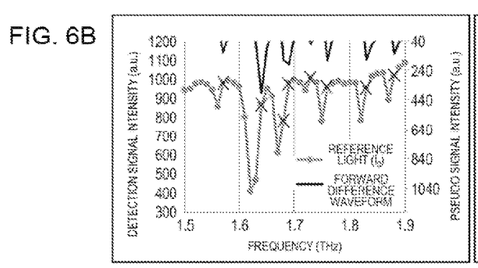
FIGS. 6B to 6F show examples of restoration based on linear interpolation for a removed part in step S155.
Figure 6C:
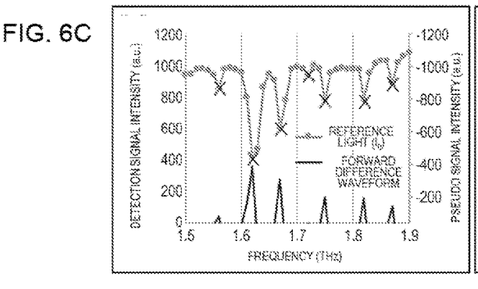
Figure 6D:
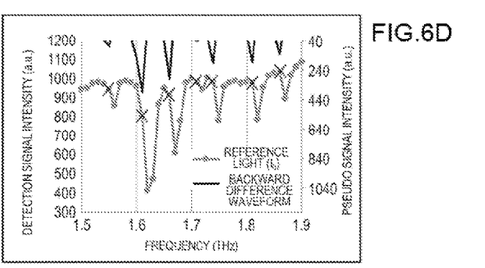
Figure 6E:
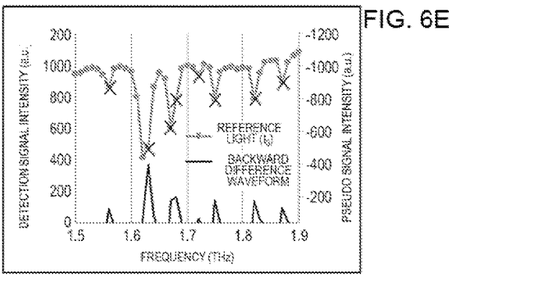
Figure 6F:
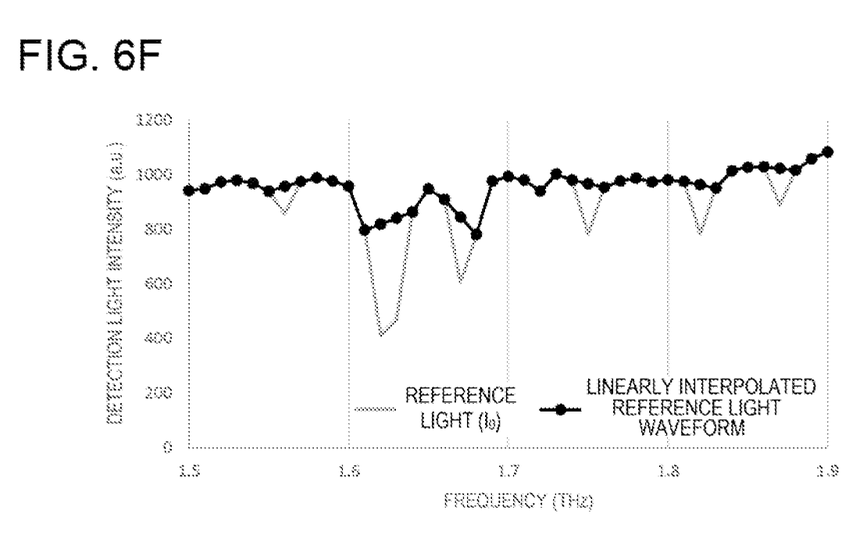

(b') and (c') of FIG. 6A show results indicating negative waveforms among the threshold signal waveforms Io' generated by [Equation 3] and [Equation 4]. As compared with (a) of FIG. 6A, detection accuracy of the bottom portion of the absorption peak appears to be the same, but situation differs according to the number of data points forming the absorption peak. In (b') and (c') of FIG. 6A, since the determination is performed based on a change amount of the detection signal intensity between the data, when it is assumed that a change in a detection light intensity is very small and the bottom portion is formed of data of three or more points, data that cannot be detected is included in (b') and (c'). As described above, the threshold processing unit 232 according to the present embodiment performs the threshold processing using any one of the attenuation coupling waveform, the forward difference waveform, and the backward difference waveform. In either case, the threshold processing is executed with a threshold generated by using the signal from the near-infrared light detector 225. After the data is removed by such threshold processing, the data is restored by using, for example, linear interpolation as illustrated in FIG. 6B.

From the above, in a case of completely removing the absorption peak of the water vapor, a part of or almost all of data constituting the absorption peak can be detected by complementarily using the coefficients (a), (b), and (c) of FIG. 4. For example, the removal of the absorption using only the coefficients (a) of FIG. 4 is a method in which a small to medium removal effect is expected by adjusting the sum of the coefficients within a range of less than 1, and is applied to a case of detecting and removing only the bottom portion of the absorption peak. When the detection is difficult with only the coefficients (a), the skirt portion of the absorption peak is detected and removed by using the coefficients (b) and (c). By combining the coefficients (a) to (c), almost all (bottom+skirt) of the data points constituting the absorption peak can be detected, and the removal effect can be improved. When a plurality of absorptions derived from the sample are present near the absorption peak of the water vapor and the absorption of the sample is small, it is appropriate to perform the removal by using all the processing of the coefficients (a) to (c).

Since the measurement is performed with a frequency resolution of 10 GHz as described above, a frequency shift of about ±10 GHz occurs at each absorption peak frequency, and the threshold signal waveform Io' is also generated following this shift. Accordingly, the non-reproducibility of the data for each measurement, such as the frequency shift or the change in the signal intensity, is not a problem.

By using the detection signal data subjected to the above operation, an absorption spectrum in which the influence of the water vapor in humid air is reduced can be acquired. The detection signal data acquired under dry air and the detection signal data under humid air subjected to the above processing are converted into absorption spectrum data by the absorbance calculation unit 234. After smoothing processing of a noise signal based on a Savitzky-Golay filter or a moving average is performed, the absorption spectrum is calculated according to a Lambert-Beer law, as shown in the following [Equation 5].

$$A = -\log_{10} I/Io \quad \text{[Math. 5]}$$

A is the absorbance, Io is an intensity of the incident light, and I is a transmitted light intensity of a substance.

Figure 7A:
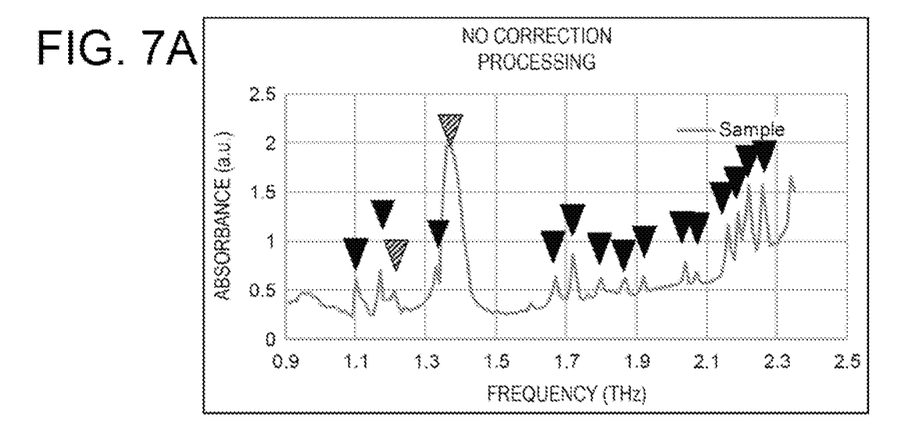
FIGS. 7A and 7B show examples of an absorption spectrum calculated by using an attenuation coupling waveform in a procedure of the flowchart of FIG. 2 based on a signal waveform detected in humid air.
Figure 7B:
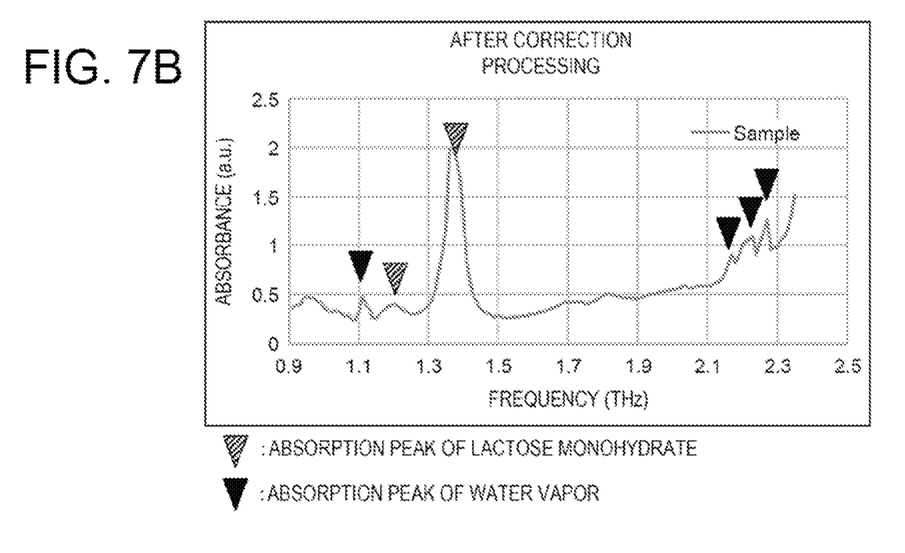

FIG. 7 shows examples of the absorption spectrum calculated by using the attenuation coupling waveform in the procedure of the flowchart of FIG. 2 based on the signal waveform detected in humid air. (a) of FIG. 7 is a spectrum calculated without processing the absorption of the water vapor, and (b) of FIG. 7 is a spectrum calculated based on a signal in which the absorption peak of the water vapor is removed and which is linearly interpolated. The sample is lactose monohydrate used as a general excipient component, and an absorption spectrum unique near 1.21 THz and 1.38 THz is shown. In a state of (a) of FIG. 7, the absorption of the water vapor and the absorption of the sample overlap each other and the spectrum contains noise, whereas in (b) of FIG. 7, a spectrum in which the absorption derived from the sample can be confirmed is obtained. As in (a) of FIG. 7, a width of an absorption peak exhibited by a solid sample is broader than the absorption of the water vapor. Therefore, when all data corresponding to an absorption peak width of the water vapor is removed and linearly interpolation is performed, the absorption peak derived from the sample is not lost. As described above, when the absorption derived from the sample and the absorption frequency of the water vapor are close to each other, the data is acquired at a high resolution (at a narrow frequency interval) only in a corresponding frequency band, and thus separability of the peak can be further improved.

Second Embodiment

Figure 8:
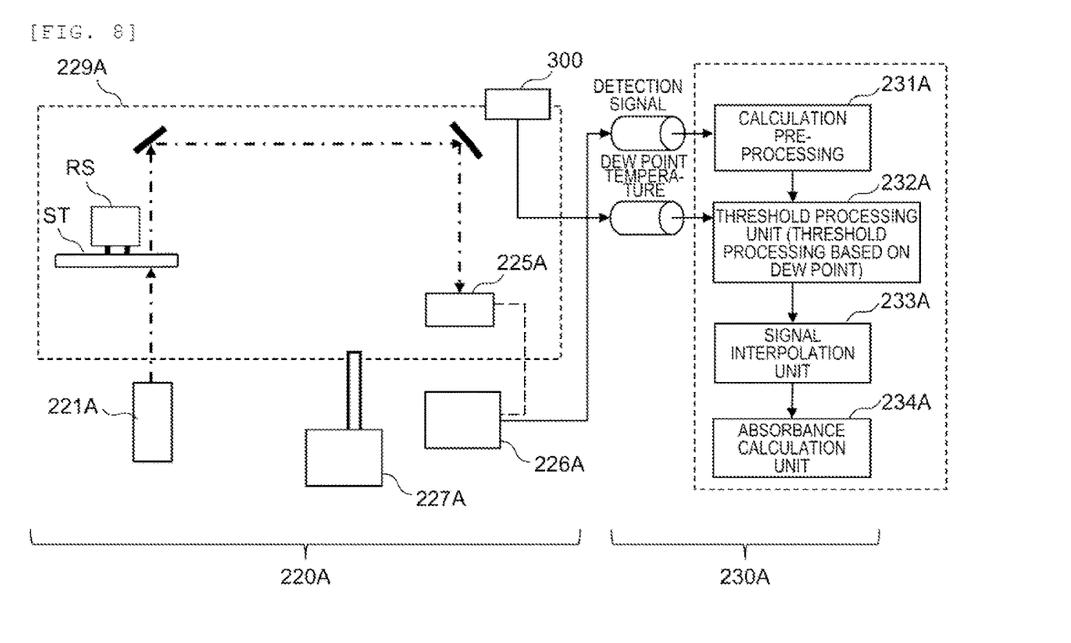
FIG. 8 is a schematic diagram illustrating a configuration of a far-infrared spectroscopy device according to a second embodiment.

Next, a far-infrared spectroscopy device according to a second embodiment will be described with reference to FIG. 8. In FIG. 8, a part of the drawing is simplified in order to clarify differences from the first embodiment. The far-infrared spectroscopy device according to the second embodiment includes, in addition to the configuration shown in FIG. 1, a dew point measuring instrument 300 and a threshold processing unit 232A that performs threshold setting based on a dew point temperature. In FIG. 8, elements denoted by A at the end are substantially the same as the elements denoted by the same reference numerals in FIG. 1, and duplicate descriptions will be omitted below.

The dew point measuring instrument 300 is a measuring device that measures a dew point temperature of an atmosphere inside a sealed chamber 229A, especially around a sample. A control unit 226A changes a parameter of the threshold setting in the threshold processing unit according to the dew point temperature from the dew point measuring instrument 300.

Since the higher the dew point temperature, the stronger an attenuation caused by a decrease in a signal intensity and an absorption of water vapor, resetting of a threshold suitable for the dew point temperature may be required in order to detect an absorption peak of the water vapor. In addition, when measurement is continued while maintaining a high dew point temperature, the attenuation of a detection signal intensity tends to be larger in the sample in which moisture in humid air is adsorbed over time than that of a detection signal intensity of reference data in which light passes no sample. In this way, when a deviation occurs in a fluctuation of the signal intensity between the reference data and data acquired with the sample interposed, it is considered that the threshold setting based on the reference data is inappropriate for the sample.

The dew point temperature measured by the dew point measuring instrument 300 can be used for automatically selecting a parameter necessary for the threshold setting in the threshold processing unit 232A. For example, a filter coefficient of primary coupling used to generate the threshold signal waveform (Io') can be changed according to the dew point temperature. By preparing a plurality of filter coefficients weighted in consideration of the dew point temperature in stages, the absorption peak of the water vapor can be removed according to the dew point temperature acquired from the dew point measuring instrument 129 at the time of measurement.

In addition to the above threshold setting, it is also effective to use, as the reference data, a detection signal intensity obtained by making terahertz light pass through a sample similar in property to a target sample in acquisition of the reference data. Specifically, when measuring an active ingredient in a medicine tablet as a target, a method of using, as the reference data, a detection signal obtained by light passing through a sample (placebo) that does not contain an active ingredient and includes only an excipient component may be adopted. In this case, influences of the water vapor on the reference data and the detection signal of the sample are similar, and a difference in a frequency domain in which contribution of the active ingredient appears can be clarified.

Third Embodiment

Figure 9:
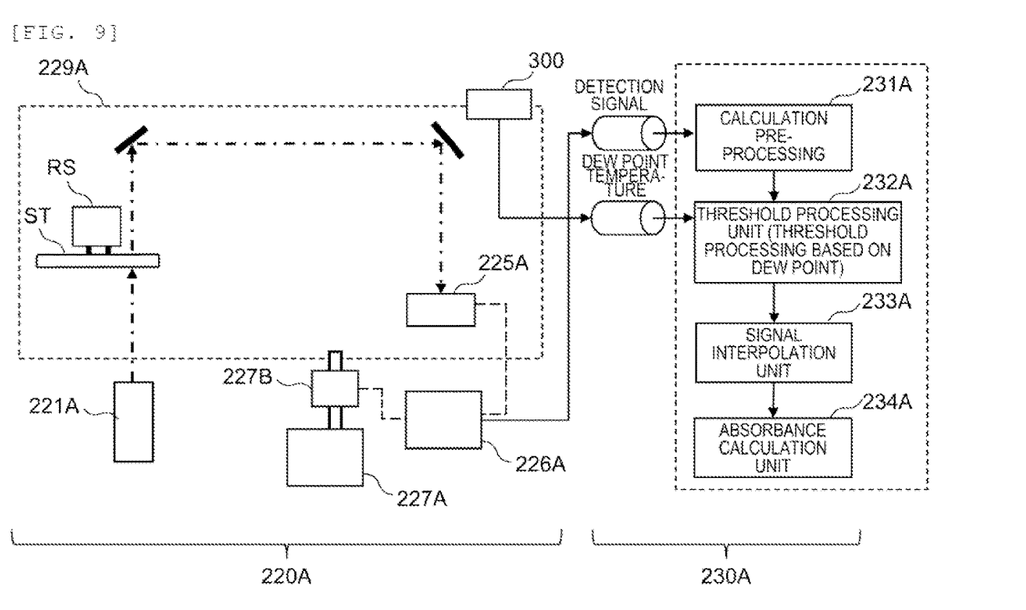
FIG. 9 is a schematic diagram illustrating a configuration of the far-infrared spectroscopy device 100 according to a third embodiment.

Next, a far-infrared spectroscopy device according to a third embodiment will be described with reference to FIG. 9. The far-infrared device according to the second embodiment further includes, in addition to the configuration in the second embodiment, a solenoid valve 227B that opens and closes a dry air supply unit 227A.

The control unit 226A compares a dew point temperature designated by a user with the dew point temperature from the dew point measuring instrument 300, and controls opening and closing of the solenoid valve 227A such that the designated dew point temperature is reached inside the sealed chamber 229A. By obtaining the designated dew point temperature according to a measurement result of the dew point measuring instrument 300, the threshold setting performed by the threshold processing unit 232A can be optimized. According to the above configuration, measurement can be performed in a state in which a dew point temperature suitable for a sample is held, and a change in properties or crystalline forms of the sample due to humidity can be prevented.

The invention is not limited to the embodiments described above and includes various modifications. For example, the embodiments described above have been described in detail for easy understanding of the invention, and the invention is not necessarily limited to those including all the configurations described above. In addition, a part of a configuration of one embodiment can be replaced with a configuration of another embodiment, and a configuration of one embodiment can be added to a configuration of another embodiment. In addition, a part of a configuration of each embodiment can be added to, deleted from, or replaced with other configurations.

REFERENCE SIGNS LIST 211 near-infrared light source (pump light)
212 polarization beam splitter
213 near-infrared light source (seed light)
214, 215 optical element
216 mirror
221 nonlinear optical crystal (terahertz light generation unit)
222 Si prism (terahertz light generation unit)
221' nonlinear optical crystal (detection light generation unit)
222' Si prism (detection light generation unit)
223 light guiding optical system
ST sample table
RM moving stage
225 near-infrared light detector
226 control unit
227 dry air supply unit
229 sealed chamber
230 detection signal processing unit
231 calculation pre-processing unit
232 threshold processing unit
233 signal interpolation unit
234 absorbance calculation unit

The invention claimed is:

1. A far-infrared spectroscopy device comprising:
a holding mechanism configured to hold a sample in humid air;
a detector configured to detect light obtained by emitting far infrared light onto the sample; and
a signal processing unit configured to calculate an absorption spectrum of the sample based on a signal from the detector, wherein
the signal processing unit includes:
a threshold processing unit configured to perform threshold processing on the signal from the detector and remove a part of the signal influenced by an absorption of water vapor in the humid air,
a signal interpolation unit configured to interpolate the signal subjected to the removal performed by the threshold processing unit, and
an absorbance calculation unit configured to calculate an absorbance based on the signal interpolated by the signal interpolation unit.

2. The far-infrared spectroscopy device according to claim 1, wherein
the threshold processing unit is configured to perform the threshold processing with a threshold signal generated by using the signal from the detector.

3. The far-infrared spectroscopy device according to claim 2, wherein
the threshold processing unit is configured to determine whether to remove only a part of or an entire of an absorption peak of the water vapor.

4. The far-infrared spectroscopy device according to claim 2, wherein
the threshold processing unit has a plurality of coefficients to be multiplied by the signal from the detector.

5. The far-infrared spectroscopy device according to claim 1, further comprising:
a first near-infrared light source configured to emit pump light;
a second near-infrared light source configured to emit seed light; and a nonlinear optical crystal configured to generate far infrared light when near-infrared light from the first and second near-infrared light sources is incident thereon.

6. The far-infrared spectroscopy device according to claim 5, further comprising:
a second nonlinear optical crystal configured to generate detection light when the far infrared light and the pump light is incident thereon.

7. The far-infrared spectroscopy device according to claim 1, further comprising:
a dew point measuring instrument configured to measure a dew point of an atmosphere around the sample, wherein
the threshold processing unit is configured to perform the threshold processing on the signal from the detector with a threshold determined by using a signal from the dew point measuring instrument.

8. The far-infrared spectroscopy device according to claim 7, further comprising:
a control unit configured to control a valve of a dry air supplier based on the dew point measured by the dew point measuring instrument.

9. The far-infrared spectroscopy device according to claim 1, wherein
the signal processing unit is configured to, when acquiring a detection signal for each measurement frequency within a predetermined frequency range, acquire a detection signal in a vicinity of a frequency, which is affected by the absorption of the water vapor, at a frequency interval narrower than that in other frequency ranges.

10. The far-infrared spectroscopy device according to claim 1, wherein
the signal processing unit further includes a calculation pre-processing unit, and
the calculation pre-processing unit is configured to use, as detection signal data of reference light, detection signal data acquired by holding a sample containing only an excipient without an active ingredient in the sample holding mechanism.

* * * * *